(12) United States Patent
Bleumer et al.

(10) Patent No.: US 7,558,633 B2
(45) Date of Patent: Jul. 7, 2009

(54) TEST SYSTEM FOR A USER TERMINAL APPARATUS AND TEST AUTOMATION METHOD THEREFOR

(75) Inventors: Gerrit Bleumer, Schildow (DE); Stefan Schwarz, Berlin (DE)

(73) Assignee: Francotyp-Postalia GmbH (DE)

( * ) Notice: Subject to any disclaimer, the term of this patent is extended or adjusted under 35 U.S.C. 154(b) by 399 days.

(21) Appl. No.: 11/485,120

(22) Filed: Jul. 12, 2006

(65) Prior Publication Data

US 2007/0038583 A1 Feb. 15, 2007

(30) Foreign Application Priority Data

Aug. 12, 2005 (DE) .................. 10 2005 038 151

(51) Int. Cl.
*G05B 11/01* (2006.01)
*G06F 11/273* (2006.01)
*G06F 12/14* (2006.01)
*G01M 19/00* (2006.01)
*G07B 17/04* (2006.01)

(52) U.S. Cl. .................. 700/26; 714/25; 702/108; 705/405

(58) Field of Classification Search .................. 700/26; 455/67.11, 67.12; 714/25–31, 48–51; 703/13–22; 702/108, 113–118, 122, 188; 705/400, 401, 705/405; 726/10, 16–21
See application file for complete search history.

(56) References Cited

U.S. PATENT DOCUMENTS 3,988,579 A 10/1976 Bottard et al.
4,122,769 A 10/1978 Sery et al.
4,421,977 A * 12/1983 Kittredge .................. 235/101
4,525,786 A 6/1985 Crowley et al.
4,639,918 A 1/1987 Linkowski
4,780,601 A * 10/1988 Vermesse .................. 235/375
4,916,626 A * 4/1990 Vermesse .................. 714/718
5,157,782 A 10/1992 Tuttle et al.
5,293,610 A * 3/1994 Schwarz .................. 711/164

(Continued)

FOREIGN PATENT DOCUMENTS

| DE | 10 2004 041 827 | 3/2006 |
|---|---|---|
| EP | 0 284 111 | 9/1988 |
| EP | 0 493 948 | 7/1992 |
| EP | 0 675 463 | 10/1995 |

*Primary Examiner*—M. N. Von Buhr
(74) *Attorney, Agent, or Firm*—Schiff Hardin LLP

(57) ABSTRACT

In a test automation method and test system for a user end apparatus that can be communicatively connected with a test automation apparatus, at least one data processing unit and a non-volatile memory for storage of a test workflow program as well as a first external interface and a second external interface are provided. The user end apparatus has at least one control unit, a non-volatile memory and an external interface. The user end apparatus is protected by a security housing and has an external interface that can be placed in communication with the special second external interface of the test automation apparatus. By loading release software, the user end apparatus is programmed to generate test output signals and to supply these to the external interface. The data processing unit of the test automation apparatus is programmed via the test workflow program for execution of at least one routine for at least one test case and is connected with the special interface via which the test input signals (simulated in the test case) are transmitted to the internal interface of the user end apparatus.

22 Claims, 5 Drawing Sheets

U.S. PATENT DOCUMENTS

| | | | |
|---|---|---|---|
| 5,323,323 A * | 6/1994 | Gilham | 705/403 |
| 5,742,754 A * | 4/1998 | Tse | 714/38 |
| 5,781,720 A * | 7/1998 | Parker et al. | 714/38 |
| 5,911,059 A * | 6/1999 | Profit, Jr. | 703/23 |
| 6,163,805 A * | 12/2000 | Silva et al. | 709/227 |
| 6,279,124 B1 * | 8/2001 | Brouwer et al. | 714/38 |
| 6,292,909 B1 * | 9/2001 | Hare | 714/40 |
| 6,522,936 B1 | 2/2003 | Hyodo et al. | |
| 6,584,432 B1 * | 6/2003 | Holzinger et al. | 702/188 |
| 6,622,184 B1 * | 9/2003 | Tabe et al. | 710/36 |
| 6,769,065 B2 * | 7/2004 | Mayer | 726/2 |
| 6,775,778 B1 * | 8/2004 | Laczko et al. | 713/194 |
| 6,904,389 B2 * | 6/2005 | Hornberger et al. | 702/188 |
| 6,990,423 B2 * | 1/2006 | Brown et al. | 702/117 |
| 7,228,264 B2 * | 6/2007 | Barrenscheen et al. | 703/23 |
| 2002/0013773 A1 | 1/2002 | Reisinger | |
| 2004/0249575 A1 | 12/2004 | Hellmold | |
| 2007/0043986 A1 * | 2/2007 | Bancel et al. | 714/724 |

* cited by examiner

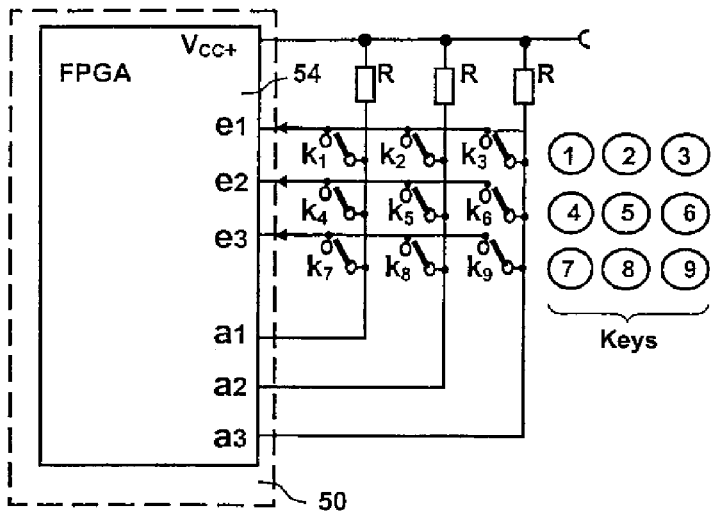
Fig. 6                    Fig. 7
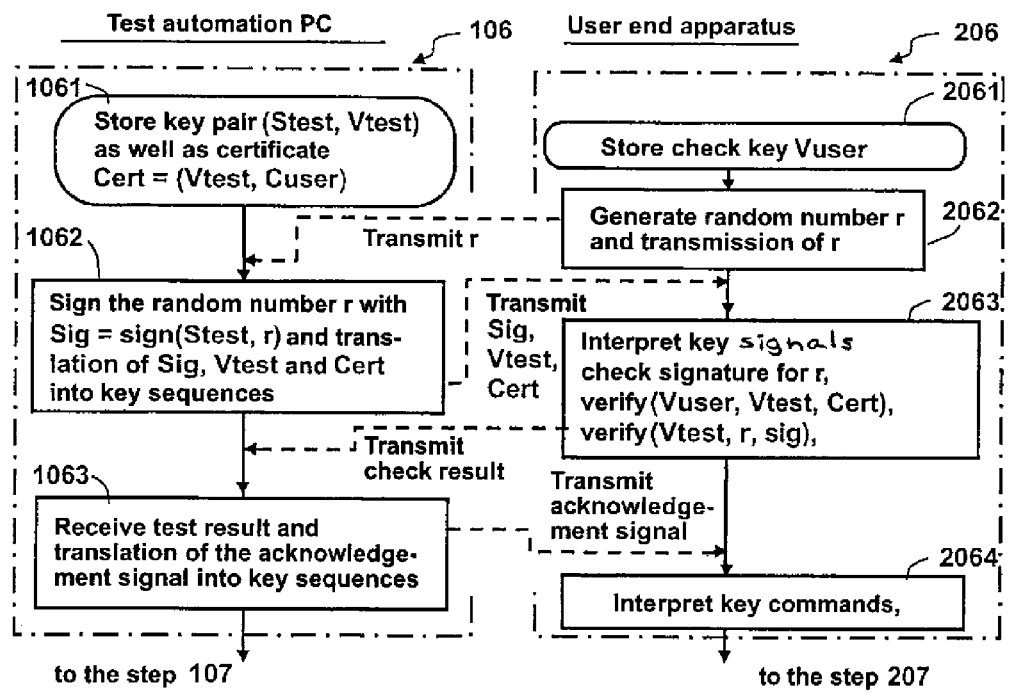
Fig. 9

TEST SYSTEM FOR A USER TERMINAL APPARATUS AND TEST AUTOMATION METHOD THEREFOR

BACKGROUND OF THE INVENTION

1. Field of the Invention

The present invention concerns a test system for a user end apparatus and an automated test method for such a terminal apparatus, suitable for automated testing and diagnosis of franking machines or accounting or mail processing apparatuses or other user end apparatuses.

2. Description of the Prior Art

The T1000 line of franking machines from the manufacturer Francotyp-Postalia GmbH, which can be connected with an external service computer via an interface cable, is known for low numbers of incoming mail. Inside a security housing, the franking machine has a permanently arranged thermotransfer print head for printing a franking imprint and an external standard interface for connection of a postage scale, a service computer of the type SC03 or other peripheral apparatuses. The service computer is used only for readout and documentation of machine parameters of franking machines manufactured in a series, but effects no data input via the standard interface.

Another known franking machine of the type Jetmail® by the manufacturer Francotyp-Postalia GmbH is provided for offices with medium to high amounts of incoming mail and can likewise be connected with a service computer that (via interface cable) establishes an electrical conduction connection with the franking machine which outputs register states and machine parameters as needed.

Known from EP 675 463 B1 is a franking machine by the company SECAP that has a serial interface via which display data are wholly or partially continuously provided to the outside. A disadvantage thereof is that the operating data are continuously unconditionally provided to the outside, such as to an additionally-mountable LCD display device. It is advantageous that no intermediate personal computer is required for this purpose.

A franking machine of the company NEOPOST, which is connected with a computer or workstation for input of franking data is known from EP 493 948 B1. For general operation it is very costly for such an expensive apparatus to be required in addition to the franking machine.

U.S. Pat. No. 4,525,786 discloses a franking machine of the company Pitney Bowes in which a program fragment is stored that ensures that the critical accounting data stored in the non-volatile memory by a microprocessor of the franking machine during a last usage phase are set to predefined values, but at the same time prevents (by means of a block bit) this from occurring multiple times after the serial number of the franking machine has been input. An external terminal that can be connected via a data cable to an external franking machine interface serves for input.

A franking machine of the company Pitney Bowes that can be initialized and configured in the factory and in the field via a franking machine interface by means of an external program controller is known from U.S. Pat. No. 4,825,786. The franking machine does not need to be taken apart for testing.

The connection of a personal computer, laptop or notebook PC to a franking machine of the type Jetmail® in order to initialize the franking machine is known from DE 100 36 623 A1. An initialization ensues only after successful identification of the personal computer, laptop or notebook PC, and authorization for the initialization ensues by means of an authorization unit, for example by means of an FP card that is inserted into the chip card reader of the franking machine. The initialization also includes input of the date of the battery of a security module of the franking machine, a telephone number of the tele-postage data center of the country of destination and a postage retrieval number PAN as well as (given the use of tele-postage data center) a loading of keys for a credit downloading into the security module. No testing of franking machines manufactured in a series is provided with the aforementioned means.

An automatic self-test of a franking machine is known from U.S. Pat. No. 4,639,918, wherein the user of a franking machine can set a test mode and its keyboard is used to select (via input of a code) a test program from among a number of possible test programs such that the franking machine then executes the selected test program an can execute a diagnosis test. It is disadvantageous that a readout and documentation of diagnosis test data can ensue only visually and manually. These diagnosis test data are read out by the service computer upon a repair or cyclical testing of the franking machine, and thus not during the serial manufacture of franking machines, nor automatically.

It is generally known in the prior art to automatically test user end apparatuses at production, such that selected user end apparatuses are subjected to an endurance test in the operating mode, but franking machines are subject to very high requirements and therefore require a special approval.

In the development of franking machines, a DEBUG version and a RELEASE version are conventionally produced before the mass production of the franking machines. For error correction, the DEBUG version differs from the RELEASE version by the provision of additional hardware, measurement points and interfaces for connection of measurement and analysis apparatuses. A RELEASE version of the franking machine is given to the postal authority. Before the mass production of franking machines, approval by the postal authority or by a governmental authority charged with this responsibility is required. The postal authority either itself conducts numerous tests on the franking machine, or engages an independent testing laboratory for this testing. Naturally, the DEBUG version of a franking machine already allows a testing of at least individual components or structural groups of the franking machine, but only by the aforementioned provision of additional hardware, measurement points and interfaces for connection of measurement and analysis apparatuses. These additional means must be removed for generation of the RELEASE version of the franking machine, since otherwise the franking machine would be manipulable by a third party with fraudulent intent. Naturally no approval is awarded to a manipulable version of the franking machine. It is disadvantageous that the DEBUG version exhibits a different time response compared to the RELEASE version. In modern franking machines, current processors with very high clock speeds are operated that make a very high processing speed (and therewith modern cryptography) possible in the first place. A different time response relative to the DEBUG version therefore can cause an error, and approval of the franking machine would consequently be denied. Franking machines are in fact affected due to the very high requirements, but there are also constantly new norms to be taken into account for other user end apparatuses and therewith also new certifications to obtain if the manufacture wants to be successful in a market with its product.

In order to test a user end apparatus, in the ideal case all possible user inputs must be run through in order to test every possible behavior of the user end apparatus and to match them to the specified desired behavior. In order to also only approximately achieve this complete test, given complex and multifunction user end apparatuses the user inputs should be automated. So that the test results are significant, the automation must ensue such that the test inputs via an input event management system of the operating system of the user end apparatus are not processed with a different priority and different time response than inputs via the keyboard. Moreover, a disadvantage of the user end apparatus must be overcome, this disadvantage being that a behavior that deviates from the behavior of the user end apparatus with release software is identified in the test by a specially-created test software.

So that many functions of the user end apparatus can be tested in an automated manner, the user end apparatus must output all relevant outputs to a suitable test interface in a suitable format so that a data processing device suitable for test automation can detect, record and process the relevant outputs for each input. Limitations for the outputs result in that not all outputs are relevant and must be output by the user end apparatus with release software; some should not be output and a few must not be output.

SUMMARY OF THE INVENTION

An object of the present invention is to achieve test automation with a test system for a user end apparatus in order to enable an automated input and therewith faster and more complete testing, whereby the user end apparatus does not exhibit the aforementioned disadvantages. Moreover, a test automation method should be achieved that reproduces how a user end apparatus with release software can be prepared such that an automated testing of all relevant outputs is enabled without the situation that security-critical outputs can be queried or intercepted in an unmonitored manner in the productive normal operation. Therefore the outputs at a test interface are to be unavailable in a manner protected such that they cannot be misused in normal operation by a user with fraudulent intent.

The invention is based on the recognition that every user end apparatus has a series of input and output interfaces, whereby already-present internal interfaces are also used for test purposes in accordance with the invention in order to test at least one individual structural group of the user end apparatus and associated software components. An internal interface is protected by the housing of the user end apparatus in an advantageous manner. The internal interface is usable for additional test purposes only after corresponding authorization of the test automation device. In the simplest case, only a keyboard is connected at an internal interface, via which keyboard all user inputs are received in the normal operation case. For test purposes, a test automation device inputs simulated key signals via this already-present internal interface. A conversion (translation) of the inputs enables additional inputs, which are not possible in the normal operation case, to be entered via the normal keyboard. A non-volatile memory of the user end apparatus is fashioned for loading of release software. A user end apparatus simultaneously has a series of output interfaces and actuators. In the case of franking machines, these include a display and a printing group in order to generate franking imprints as well as motors or electromagnets as electromechanical actuators. A chip card write/read device can additionally be provided in order to write data to a chip card. Through Via corresponding authorization via additional inputs, the outputs are protected such that they cannot be misused by a user in the normal operation.

The test system includes a test automation apparatus, the user end apparatus and communication connections between both apparatuses via corresponding interfaces. The test automation apparatus is realized by a typical data processing device which is equipped with at least one expansion card via which at least one bidirectional serial interface can be activated. A typical data processing device can be a commercially-available personal computer that is already prepared for insertion of expansion cards.

To achieve the automation the test automation apparatus has a signal generator that generates simulated test input signals and transmits them to the user end apparatus. External test inputs can be entered via the keyboard interface of the user end apparatus, and the test inputs are processed by an input event management system of the operating system of the user end apparatus with the same priority and time response as the inputs entered via the keyboard. Moreover, only a single release software loaded into the user end apparatus exists for the test; which means that there are no different software versions. The disadvantages associated with a specially-created test software thus can no longer occur, these disadvantages including a behavior being identified in the test that cannot occur in the productive software.

The test automation apparatus has a program memory, a data processing unit and a contact field for controlling contacts that serve for translation of test actions and data of the test case into simulated test input signals. An expansion card is provided for activation of the contacts and the interfaces.

In order to completely test the basic functionally of the user end apparatus, the inputs from the test automation apparatus are generated according to a stored test plan and are transmitted to the user end apparatus as input signals. The resulting outputs of the user end apparatus at the display thereof and at the printing system are subsequently transmitted back to the test automation apparatus as output signals and there are compared against the desired values stored in the test plan.

The test automation method includes the steps:

i. providing a test program and executing at least one routine for a first test case, ii. translating of test actions and data of the test case into simulated test input signals (key sequences), iii. transmitting of the simulated test input signals to the user end apparatus, iv. interpreting of the simulated test input signals in the user end apparatus, v. implementing a corresponding control in the user end apparatus and converting display contents and control signals (actuator signals) into test output signals, vi. transmitting the test output signals from the user end apparatus to the test automation apparatus, and vii. translating of test output signals into evaluation data.

The test automation apparatus can test a user end apparatus that has a release software loaded therein, release software providing all relevant outputs in a suitable format without delay at a separate test interface. Typical fields of use for the test automation apparatus are:

during and after the development of a new user end apparatus model or further development of an existing user end apparatus model; after error correction of an existing user end apparatus model.

at the supplier of software components to a user end apparatus model. With the aid of the test automation apparatus, the supplier can already test the integration of his components in user end apparatuses before delivery thereof.

at the service technician for a user end apparatus model. With the test automation apparatus, a service technician at the customer can immediately check a newly-installed software component on site for successful installation.

The output data at the test interface are provided in a form so as to be protected against misuse by a user with fraudulent intent in normal operation.

DESCRIPTION OF THE DRAWINGS

FIG. 6 shows a simplified keyboard switching plan.

FIG. 7 shows a clock pulse generation plan.

FIG. 9 shows a routine for identification of the test automation apparatus versus the user end apparatus.

DESCRIPTION OF THE PREFERRED EMBODIMENTS

Figure 1:
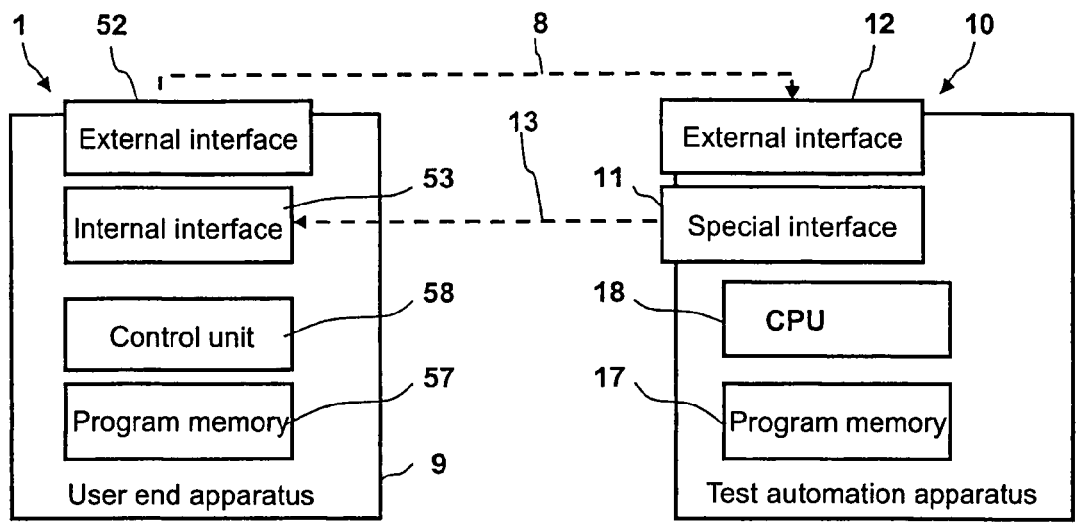
FIG. 1 is a simplified block diagram of a test system with a user end apparatus and with a test automation apparatus, in accordance with the invention.

FIG. 1 shows a simplified block diagram of a test system with a user end apparatus 1 and with a test automation apparatus 10 which can be connected in a communicative fashion (shown dashed). The test automation apparatus 10 has at least one data processing unit CPU 18 and one non-volatile memory 17 for storage of a test workflow program as well as a first external interface 12 and a second external interface 11. The user end apparatus 1 has at least one control unit 58, a non-volatile memory 57 and an external interface 52. The user end apparatus 1 is protected by a security housing 9 and comprises an internal interface 53 that can be communicatively connected with the special second external interface 11 of the test automation apparatus 10. The controller unit 58 and the non-volatile memory 57 of the user end apparatus 1 are fashioned for loading of release software, whereby the user end apparatus being programmed to process test input signals and to generate corresponding test output signals and output these at the external interface 52. The data processing unit 18 of the test automation apparatus 10 is programmed by the test workflow program for execution of at least one routine for at least one test case. The data processing unit 18 is connected with the special interface 11 via which the test input signals simulated in the test case are transmitted to the internal interface 53 of the user end apparatus 1.

Figure 1A:
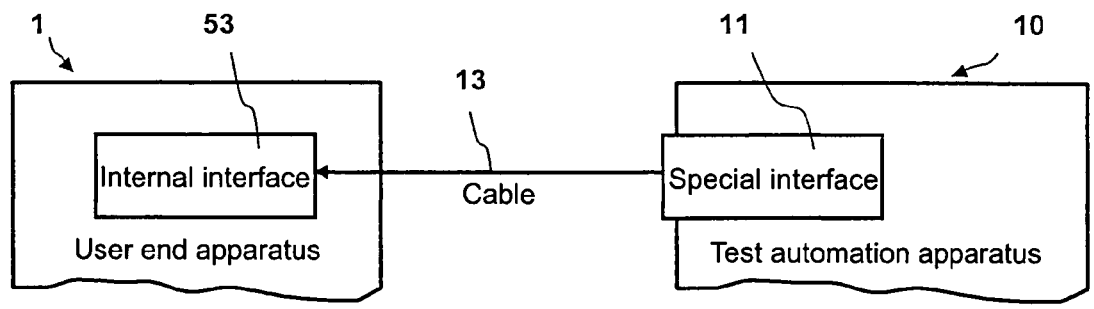
FIG. 1a shows a first embodiment of the test system with a cable connection.

FIG. 1a shows a first version of the test system with cable connection as a detail of the simplified block diagram according to FIG. 1. The communication connection ensues via a cable 13.

Figure 1B:
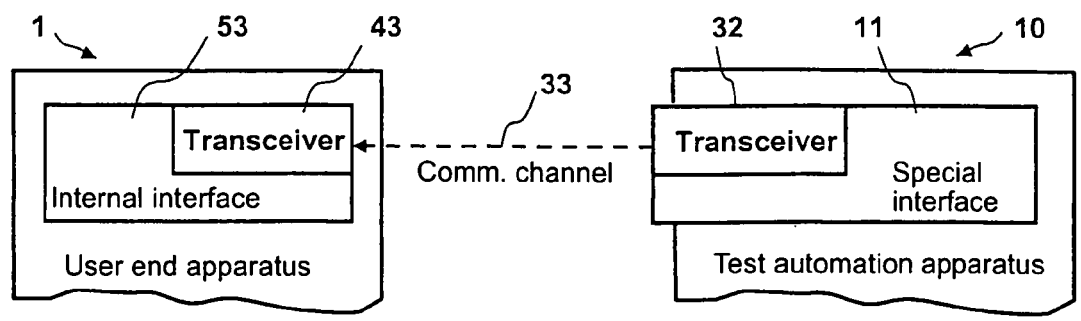
FIG. 1b shows a second embodiment of the test system with a wireless communication connection.

FIG. 1b shows a second version of the test system with a wireless communication connection. The second special interface 11 of the test automation apparatus 10 and the special interface 53 of the user end apparatus 1 are identically designed (configured) and are equipped with respective transceiver 43 and 31 which are in communication with one another via a communication channel 33.

Figure 2:
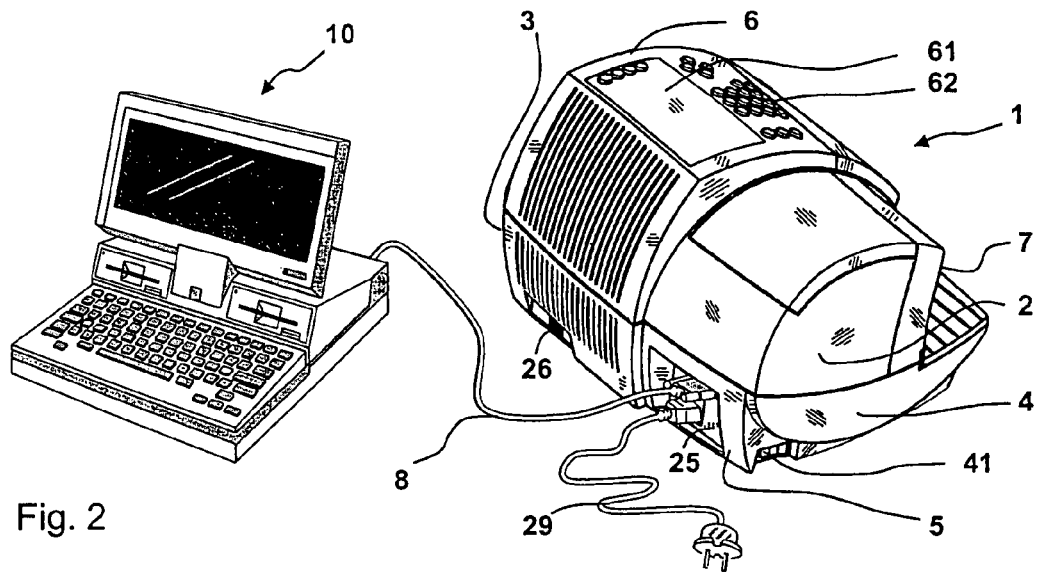
FIG. 2 is a perspective view of a franking machine and a service computer.

FIG. 2 shows a perspective view of a franking machine of the type Optimail 30® from the manufacturer Francotyp-Postalia GmbH and a computer 10 with interfaces. The franking machine and computer 10 are in communication with one another via a data cable 8. The franking machine 1 is shown from the back 5, left side 4 of the lower shell and top 6 of an upper shell 2. A switch 41 with which the franking machine can be activated (turned on) is located on the left side 4. A display device 61 and an input device 62 are arranged on the top 6. A letter feed ensues on the front side 7 of the franking machine 1 from the left side 4 to the right side 3. It is provided that the upper shell 2 is arranged over the lower shell of the franking machine housing such that said upper shell 2 can be removed. The upper shell 2 of the franking machine housing can be removed only by an authorized person, for example a service technician. A first opening 25 on the back side 5 supplies an access to a network connection via a network cable 29 and a second access to a serial interface via a data cable 8. A second opening 26 on the back side 5 near the right side 3 of the lower shell supplies an access for connection of a communication line.

Alternatively, the opening for the access to a serial interface can be arranged (in a manner not shown) in any of the two housing shells of the franking machine housing. The serial interface accessible via the first opening 25 of the franking machine housing and the serial interface of the computer 10 are of the same type.

Figure 3A:
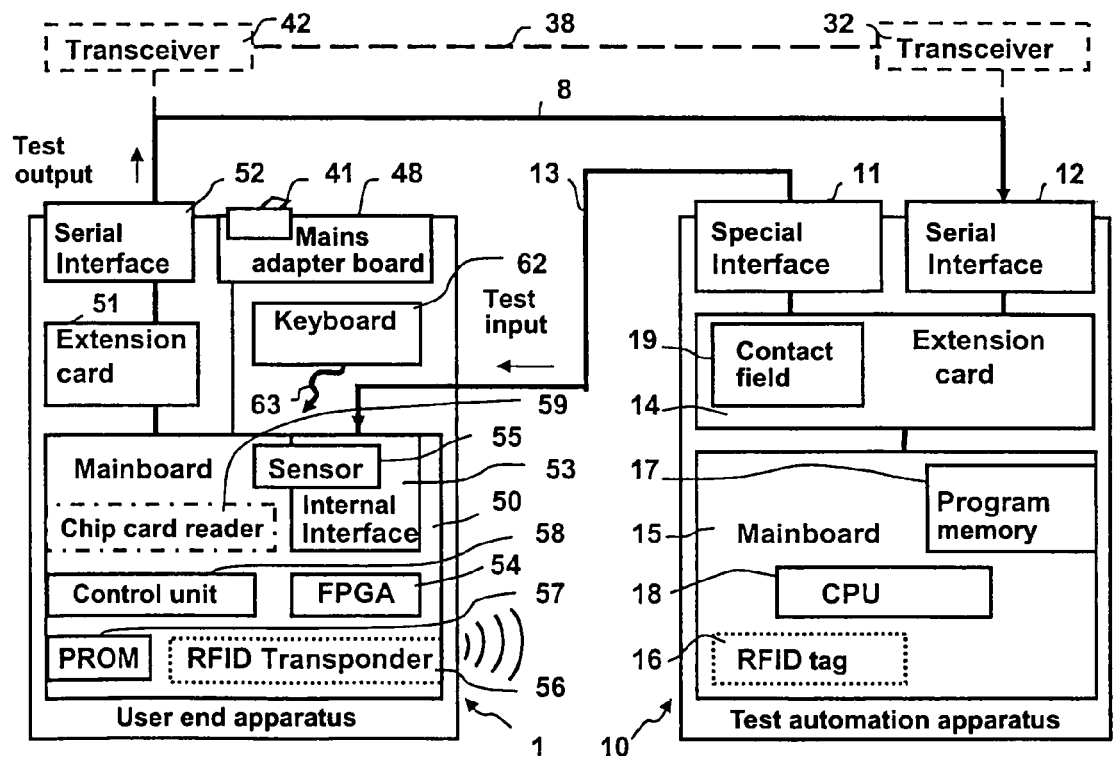
FIG. 3a is a block diagram of a test system with a user end apparatus and with a test automation apparatus in accordance with the invention.
Figure 3:
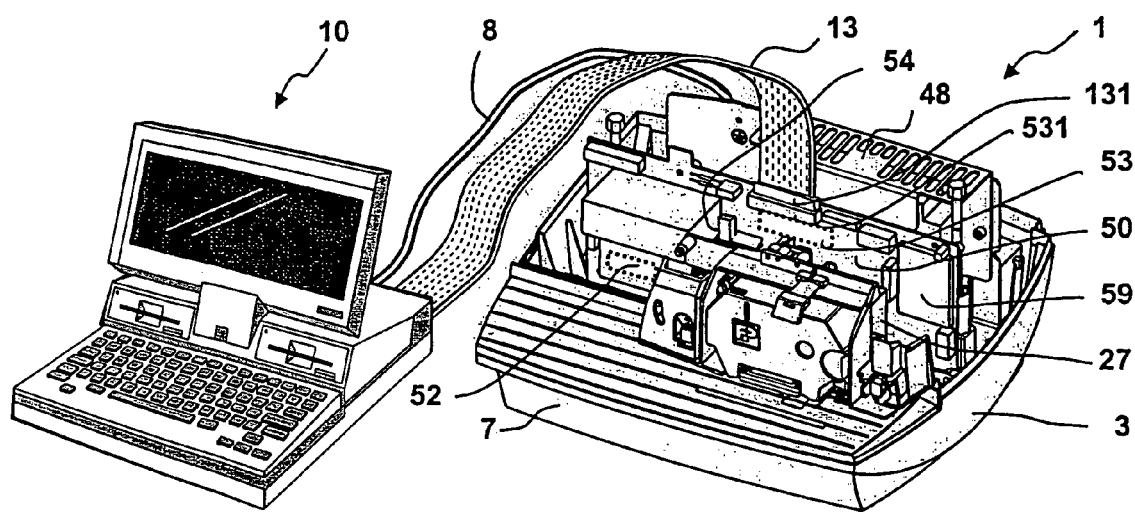
FIG. 3b is a perspective view of an opened franking machine and the test automation apparatus.

FIG. 3a shows a block diagram of a test system with a user end apparatus and with a test automation apparatus. The user end apparatus has at least one external interface 52 as a test output interface and a mainboard 50 with an internal interface 53 as a test input interface as well as an input device 62. The latter is, for example, a keyboard which in the normal operating mode is connected with the internal interface 53, but has been unplugged in the shown test mode. The mainboard 50 furthermore has at least one program memory (PROM) 57, a control unit 58, a programmable logic (FPGA) 54 and optionally a chip card write/read unit 59 (marked with dash-dot lines) or an RFID transponder 56 (marked with dots). The chip card write/read unit 59 can be provided as an additional means for identification of the test automation apparatus, with the control unit 58 of the user end apparatus 1 being programmed for input of an identification number of the test automation apparatus 10 via a chip card. An RFID transponder 56 of the user end apparatus 1 that communicates with an RFID tag 16 of the test automation apparatus 10 can also serve as additional means for identification of the test automation apparatus.

As an alternative to the programmable logic 54, an application-specific integrated circuit (ASIC) can also be used in the user end apparatus.

An expansion card 51 (extension card) can be connected between the mainboard 50 and the external interface 52. The user end apparatus 1 is connected with the test automation apparatus 10 in terms of communication. In a first embodiment variant, a first data cable 8 is used for the communication connection.

As an alternative to the data cable 8, a variant (shown dashed in FIG. 3a) is also possible that uses wireless communication technology with transceivers 42, 32 and a communication channel 38 in order to establish the communication connection between the user end apparatus 1 and the test automation apparatus 10. The aforementioned transceivers 42, 32 are either plugged onto the external interfaces or replace them.

The test automation apparatus 10 has at least one first external interface 11 as an interface for output of the test input data and a second external interface 12 as an interface for input of the test output data, as well as a mainboard 15. An expansion card 14 (extension card) that is equipped with a controllable contact field 19 is connected between the mainboard 15 and the external interfaces 11 and 12. Alternatively, the special interface can be equipped with the controllable contact field 19. The test automation apparatus has a corresponding program memory 17, a CPU 18 and (if applicable) an RFID tag (radio frequency ID) 16 (marked with dots). The first external interface 11 is adapted for output of the test input data to the internal interface 53 of the user end apparatus. In preparation for the test mode, for example, the housing of the user end apparatus is opened and a keyboard connection plug (not shown in FIG. 3a) for the keyboard of the user end apparatus is unplugged from the socket of the mainboard 15. In its place, a serial connection from the socket via a plug (not shown) and ribbon cable 13 to the serial interface of the expansion card of the test automation apparatus is now achieved by insertion of the plug. In the preferred embodiment, the test automation apparatus sends input signals of simulated keyboard presses to the user end apparatus via this connection. The user end apparatus is provided with a sensor 55 that detects whether the plug of the ribbon cable 13 of the test automation apparatus remains connected with the socket or a keyboard outlet on the mainboard 15 or in a housing cavity. The switch 41 with which the franking machine can be activated is connected with a mains adapter on the mains adapter circuit board 18, which feeds the mainboard 15 and the rest of the electrical components.

According to the invention, the first external interface 11 is used as a test automation apparatus and is placed in communication with the internal interface 53 of the user end apparatus 1. The second external interface 12 of the test automation apparatus 10 is used as a test input interface and is placed in communication with the external interface 52 of the user end apparatus 1.

The user end apparatus 1 is, for example, a franking machine of the type Optimail®. The franking machine is equipped with an internal interface 53 at which (in the manner shown in FIG. 3a) a data cable 13 of the test automation apparatus 10 is, for example, plugged in via a plug connector (shown in FIG. 3b) in the test mode. For example, a data cable 63 from the input device 62 is likewise connected with the internal interface 53 via a plug connector (not shown). The latter internal interface 53 is equipped with an FPGA (Field Programmable Gate Array) module or connected with an FPGA. The FPGA provides clock signals for the input device 62 and processes the received input signals.

In the exemplary embodiment of a franking machine of the type Optimail 30®, the input device 62 is a keyboard with an attached data cable 63 and a detachable connection to the mainboard 50. Alternatively or additionally, a detachable connection to be keyboard can be provided. In a franking machine of the type Jetmail®, a housing cavity for a detachable plug connection exists in the meter base near the keyboard. Given an unpluggable keyboard or removable meter with keyboard socket in the housing recess, the plug keyboard is alternatively removed or, respectively, the plug connection is separated and the test automation apparatus is directly connected with the keyboard socket in the housing cavity. The contact field 19 replaces the keyboard of the end apparatus 1.

In another exemplary embodiment for testing of another user end apparatus, the input device 62 can be fashioned differently, for example as a touch-screen for keyboard-less input or for speech input. The input device 62 of the user end apparatus can also be fashioned, for example as a neuronal interface. Multiple input devices can be provided and can be of the same or different types, but, at least one input device 62 of the user end apparatus that can be connected with the internal interface 53 must be present. For such input devices of user end apparatuses, a fast automatic testing of the input possibilities and the reactions thereto is already necessary because the number of input possibilities always grows further.

As an alternative to the data cable 13, a wireless communication technology is suitable in order to establish the communication connection with the internal interface 53. The internal interface 53 and the special first interface 11 of the test automation apparatus 10 are then fashioned (in a manner not shown) as transceivers. The input device 62 must then naturally likewise has a transceiver that is in a communication connection with the transceiver of the mainboard 50 in the normal operating mode. This has the advantage that the input device 62 can also be operated from outside of the user end apparatus. Such user end apparatuses are known as radio and television apparatuses or media playback or, respectively, recording/playback apparatuses that are equipped with a remote control.

In a further exemplary embodiment (not shown) for testing of a further user end apparatus, whereby the latter is already provided at the connection of a test automation apparatus, instead of being respectively connected image acquisition the same physical interface (for example RS232, USB, FireWire, Bluetooth) the user end apparatus can now be connected via the same physical interface at the second interface used for test input and the first interface of the test automation apparatus used for test output.

FIG. 3b shows a perspective view of an opened franking machine 1 and the test automation apparatus 10. Both apparatuses are shown from the front, right and above. In normal operation, the franking machine 1 is operable with a pluggable input device 62 mounted in an upper housing shell 2, but the input device 62 is removed for clarity. In the test operation, the franking machine 1 (activated by the test automation apparatus) is operable via a pluggable data cable 13 which here is fashioned as a ribbon cable. The franking machine 1 is opened and has a chassis (not visible) in the lower shell, on which a base plate 27 of the printing group is arranged near the front 7 and a mains adapter circuit board 48 is arranged near the back 5 of the franking machine 1. The main circuit board (mainboard) 50 is arranged between the base plate 27 and the mains adapter circuit board 48. The chip card write/read unit 59 is arranged on the mainboard 50 on the right side 3 of the franking machine 1. The internal interface 53 and an associated multi-pin plug bushing 531 are arranged on the side of the mainboard 50 facing the upper shell 2 of the franking machine housing, into which plug bushing 531 a plug 131 of the ribbon cable 13 is plugged. The ribbon cable 13 is connected with the test automation apparatus 10 to produce an interface. An FPGA module 54 is a component of the internal interface 53 or of the mainboard 50 and controls both mainboard 50 and the internal interface 53.

A data cable 8 (executed as a round cable) is connected with the serial interface 52 of the mainboard 50 of the franking machine 1 via the access in the first opening on the back side 5 of the franking machine 1. Suitable commercially available plug connectors or other transfer means that operate similarly can be used in a known manner. The data cable 8 is likewise connected in terms of interface with the test automation apparatus 10.

For other user end apparatuses, the plug connector and data cable or ribbon cable can be omitted when both the user end apparatus and the test automation apparatus 10 have Bluetooth communication means or other wireless communication means as input interfaces.

Figure 4:
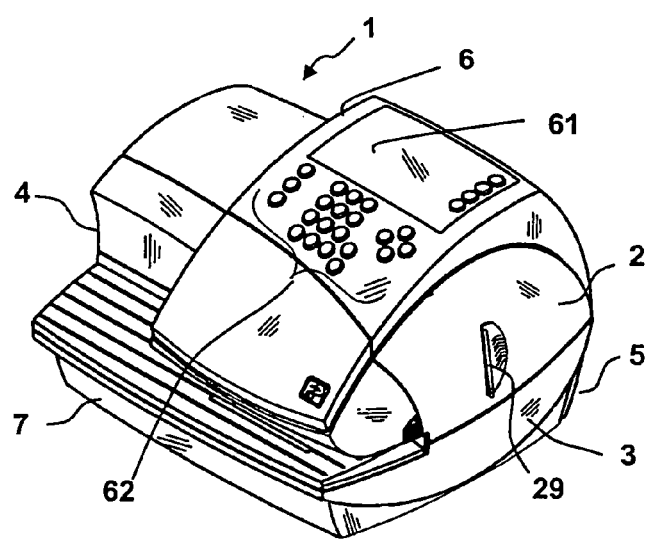
FIG. 4 is a perspective view of a franking machine with a closed housing from the front, right and above.

FIG. 4 shows a perspective view of a franking machine 1 of the type Optimail® with a closed housing from the front, right and above. Only the front side 7 and right side 3 of the lower shell of the franking machine housing are visible, however; the left side 4 and the back side 5 are hidden. The direction of mail pieces to and away ensues on the front side 7 from the left side 4 and to the right side 3 of the franking machine 1. The housing upper shell 2 is mounted on the housing lower shell. Here a display 61 and a keyboard serving as an input device 62 are visible on the top side 6 of the franking machine. For ergonomic reasons, input possibilities that would offer a different design of the key field remain unused. The space on the keypad is thus not entirely utilized.

Figure 5:
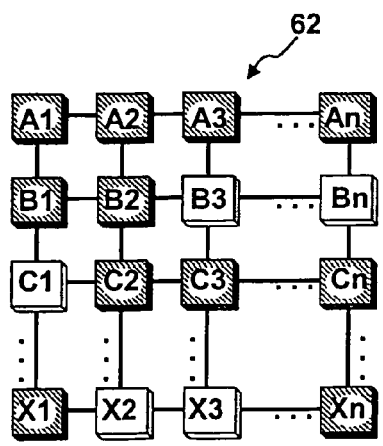
FIG. 5 is a schematic representation of a keyboard/keypad field.

The rest of the input possibilities remaining unused are emphasized in FIG. 5 using a schematic representation of a keyboard field. The keyboard of the user end apparatus is realized via a keypad that provides a matrix of keys. Of these possible keys, typically only those are used that (from the geometric position) match the keyboard layout of the user end apparatus (hatched keys). Some keys of the keypad thereby typically remain unused (white keys).

FIG. 6 shows a simplified keyboard switch plan of a keyboard of the user end apparatus. The contacts of the keys lie at the intersection points of a matrix made up of the conductors to the inputs e1, e2, e3 and to the outputs a1, a2, a3. The FPGA (Field Programmable Gate Array) module takes on the total control of the matrix. Given a key press the following occurs: at a given clock, the outputs of the FPGAs a1, a2, a3 are driven with a changing bit pattern that corresponds to a "walking zero" (see FIG. 7).

A clock generation plan is shown in FIG. 7. As long as no key is pressed, a "one" is present at each of the output lines connected to the outputs a1, a2, a3. As soon as (for example) the key "4" is pressed, the output a1 receives a zero at the clock pulses 3, 6, 9 etc.; in all other clock pulses it receives a one. So that the key press is reliably registered, it must thus last at least 3 clock pulses long. Key combinations that need a longer input or also the simultaneous combination of matrix elements are realized in that the FPGA module (according to the example of the keyboard buffer in prevalent operating systems) stores the key presses in a field and begins the processing of this buffer upon reaching an upper limit.

Given the clock pulse generation, different signal levels are present at each of the outputs a1, a2, a3. For example, the signal levels at the third clock pulse are present in the dual form 011. The duration of a cycle is equal to 150 ms given the output of signal levels in the dual form 011 again. A key is one of the function keys that require a longer actuation, whereby an overrun of the upper limit ≧50 ms amounts to a long-term actuation. A key press of at least this duration must be simulated given a simulated actuation.

Given a machine in which twenty-five keys are available due to the geometry, five keys (for example) remain unused. The input authentication is provided with a three-digit key combination, with the additional five keys being shown superimposed and being compulsorily part of this sequence, 27000 possibilities exist in the event that repetitions and a free order of the key sequences are allowed. If the keyboard is now unplugged from the mainboard and in its place the test automation apparatus is connected to the mainboard via the test input interface, the test automation apparatus can activate (for example via relay contacts) not only those key combinations that are mechanically executed but rather all of the possible keys and key combinations and therewith also every possible key sequence. Given corresponding selection of the desired keys or desired key combinations (keys that are not mechanically present, speed, number), the test automation apparatus can activate an identification sequence that a regular user cannot achieve. A test automation apparatus can be securely differentiated from a regular user in this manner and be identified by the user end apparatus.

The user end apparatus has an interface 52 (test output interface) that, for example, can be executed as a serial interface. The user end apparatus provides all relevant output data (display data, print data, motor activation signals etc.) at this interface. The test interface of the user end apparatus is connected with a further serial interface 11 of the test automation apparatus. The test automation apparatus reads in all relevant outputs of the user end apparatus via this connection.

The present control software of the user end apparatus can provide all output data of the user end apparatus, not only to its actuators, motors and display and output means but rather also to the test output interface. The type of test output data that arrives (if at all) at the test output can be set in the base configuration of the user end apparatus. The table shows an overview of which types of test output data there are and which of these might be provided only when the user end apparatus has previously securely identified the test automation apparatus:

| Output data | Authorization required? |
| --- | --- |
| Display contents | No |
| Print image data | Yes |
| Write data for the chip card write/read unit | Yes |
| Motor control signals | No |

Figure 8:
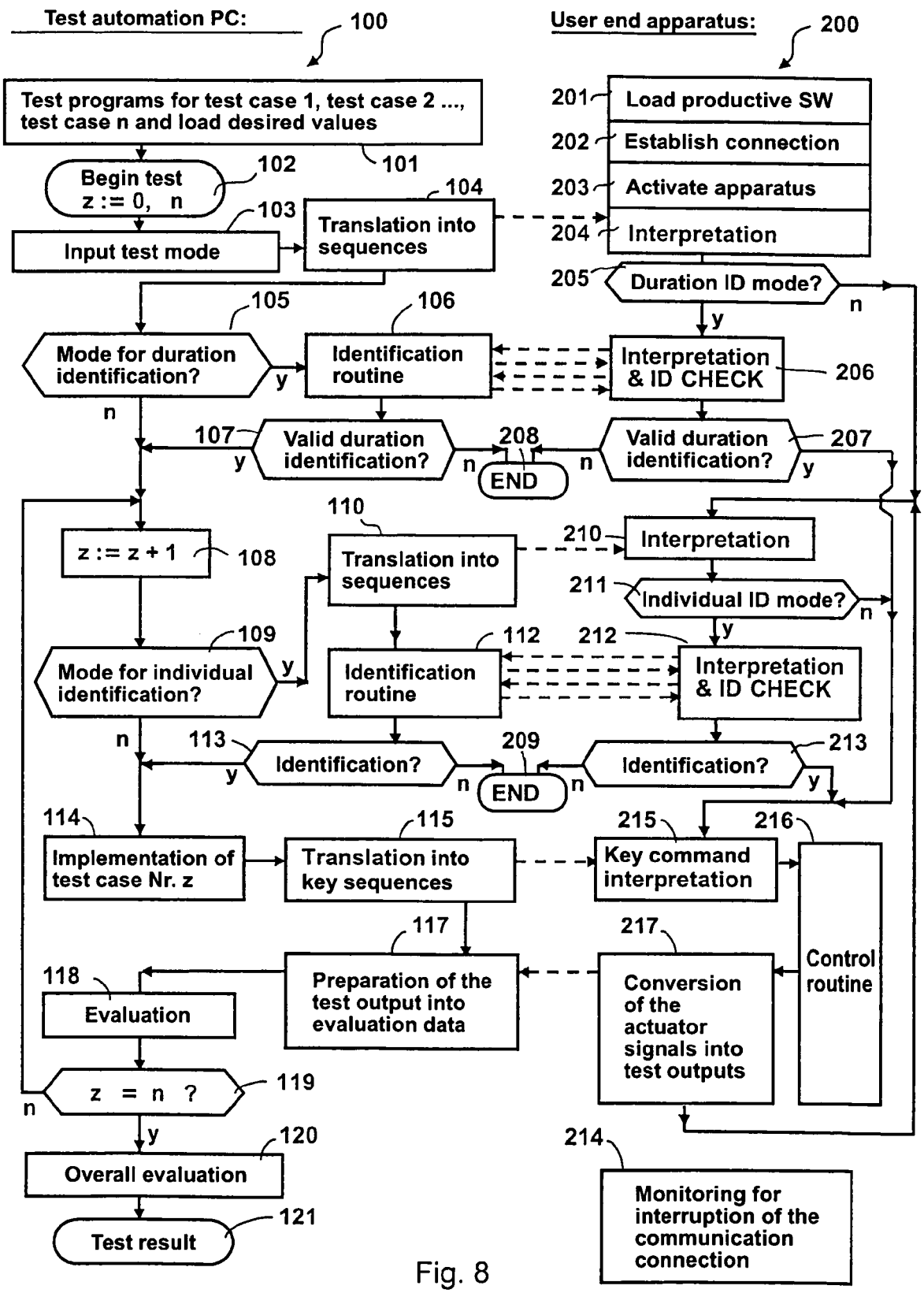
FIG. 8 is a flow chart for an automated test workflow in accordance with the invention.

A flow chart for an automated test workflow is shown in FIG. 8. The test workflow 100 includes the execution of a number n>0 of test cases that have been established in the test workflow program. The test workflow program is provided in a prepared step 101 in the program memory 17 of the test automation apparatus or is loaded into this. Moreover, it is assumed that the user end apparatus 1 stores release software in the memory PROM 57 (step 201 of the method 200) and has already been prepared for a test workflow via steps 202 and 203. In step 202 a connection is established in that, for example, the keyboard is detached and the user end apparatus 1 is connected with the test automation apparatus 10 for preparation of the test workflow, in that (for example) a cable 13 is plugged in. After the user end apparatus 1 has been activated in the step 203 via the switch 41, simulated key signals received in the step 204 are, for example, interpreted as an input of the desired test mode.

After the start of the test automation apparatus, the storage of a start count value z equal to "zero" and a count limit value n in the step 102, the test automation apparatus arrives at a step 103 for input of the test mode before the first test case.

For example, for duration identification in the step 103 a predetermined identification number is allocated given the input, which identification number is valid for the duration of the entire test. In a further subroutine (step 104), a translation of the predetermined identification number into simulated input signals (key sequences) and their transmission (dashed arrow) to the user end apparatus ensues. After the transmission of the simulated input signals to the user end apparatus, an interpretation of the simulated input signals ensues in the user end apparatus in the step 204, for example via an input event management system of the operating system of the user end apparatus. If it is established in the subsequent query step 205 that no duration identification mode is desired, the workflow then branches to the step 210 in order to receive and to interpret further signals. If it is established in the query step 205 that a duration identification mode is desired, then the workflow branches to the step 206. An interpretation and an ID check are implemented by the user end apparatus in the step 206.

The test automation apparatus, controlled by a test workflow program, proceeds to the query step 105 in order to establish whether a mode for a duration identification has been input. If this is the case, i.e. when an authorization for the entire test duration is required, an identification of the test automation apparatus versus the user end apparatus ensues in a routine. For this purpose, the workflow branches to the step 106 and an identification routine is invoked, whereby a translation of data into simulated input signals (key sequences) and their transmission (dashed arrows) to the user end apparatus are automatically effected by means of the contact field 19. Data are also received and evaluated by the test automation apparatus in the framework of the communication with the user end apparatus. In the subsequent query step 107, it can thus be established whether an ID check has been implemented in the user end apparatus and a valid duration identification has been detected. If this is the case, the workflow then branches to the step 108 and a count value z is incremented by "one". Data for mutual identification can also be exchanged in the steps 106 or, respectively, 206, which is subsequently explained in further detail using FIG. 9. Input signals, advantageously key sequences, are transmitted for identification in the exemplary embodiment according to FIG. 8.

As an alternative, an identification can be achieved in a known manner via a chip card, or an RFID tag on the one side and a chip card write/read unit, or an RFID transponder on the other side. This is explained in further detail in the following.

If, however, in the further steps 107 or 207 following the steps 106 and 206 it is established that no valid duration identification exists, the test mode (step 208) is ended.

If it is determined from the query step 105 in the test workflow program of the test automation apparatus that no mode for duration identification has been set, the workflow then branches to the step 108.

After the incrementing of a count value z in the step 108, a query step 109 is reached in the test workflow program of the test automation apparatus and it is determined whether a mode for individual identification has been set. If that is the case, the workflow branches to the step 110 and a translation of data into simulated input signals (key sequences) and their transmission (dashed arrow) to the user end apparatus is automatically effected. In a step 210, the user end apparatus receives and interprets the transmitted data. After the step 210, a query step 211 is reached by means of which it can be established whether an individual identification mode is desired or not. Via the release software it is thus enabled to set the user end apparatus to a corresponding test mode with individual identification or such a test mode without identification.

After the step 110 for transmission of simulated input signals (key sequences), the test workflow program of the test automation apparatus proceeds to the step 112 and an identification routine is invoked, whereby a translation of data into simulated input signals (key sequences) and their transmission (dashed arrow) to the user end apparatus ensues. In the communication with the user end apparatus, data are likewise sent from the user end apparatus and received and evaluated by the test automation apparatus. In the subsequent query step 113, it can thus be established whether an ID check in the user end apparatus has been implemented and whether a valid individual identification has been detected. If that is the case, the workflow branches to the step 114. If that is not the case, the workflow branches to the step 209 to end the test mode.

If it is determined by the query step 109 in the test workflow program of the test automation apparatus that no mode has been set for individual identification, the workflow immediately branches to the step 114 for implementation of the test case of the number z of the test mode.

When a desired individual identification mode has been detected by the user end apparatus, the workflow branches from the query step 211 to the subsequent step 212, whereby an interpretation of the simulated test input signals ensues by means of the input event management system of the operating system of the user end apparatus. An ID check in the user end apparatus is likewise implemented. The workflow then proceeds from the step 212 to the subsequent step 213 and the check of whether a valid individual identification has occurred is thereby skipped. If in the further steps 113 or 213 following the steps 112 and 212 it is thus established that no valid individual identification exists, the test mode is ended (step 209).

After the interpretation of the simulated input signals and establishment of a valid duration identification (query step 207) or, respectively, individual identification (query step 213) occurring in the user end apparatus in steps 206 or, respectively, 212, a step 215 is reached. However, when no individual identification mode has been detected by the user end apparatus, the workflow likewise branches from the query step 211 to the step 215, in which an interpretation of the simulated input signals into corresponding key commands ensues.

With reaching the step 114, a routine begins with the corresponding test case of the number z of the test mode. In a further subroutine (step 115), a translation of test actions and test data of the test case into simulated test input signals (key sequences) and their transmission (dashed arrow) to the user end apparatus ensues. An interpretation of the simulated test input signals ensues in step 215 via the input event management system of the operating system of the user end apparatus. A corresponding control routine in the user end apparatus is implemented in a further subroutine in the step 216. A step 217 for conversion of display contents and control signals (actuator and motor control signals) into test output signals and a transmission (dashed arrow) of the test output signals from the user end apparatus 1 to the test automation apparatus 10 then ensues in the user end apparatus 1. Through the release software of the user end apparatus 1, the workflow branches back from the step 217 to the step 210 for interpretation of further simulated input signals.

After the receipt of the test output signals, a concluding subroutine for their translation into evaluation data or, respectively, for preparation of the test output into evaluation data ensues in the step 117. The latter are transferred for evaluation in the step 118. In the query step 119, the count value z is then checked as to whether a predetermined number of n test cases have been processed. If that is not the case, the workflow then branches back to the step 108. The steps 108 through 119 are correspondingly repeated for each test case. After an execution of a number n>0 of test cases and overall evaluation in the step 120, the test result (which is stored in the step 121) is present in the test automation apparatus. The order of the workflow steps is shown in the example of a first test case. It is analogously repeated given the subsequent test cases. The test automation apparatus is advantageously a personal computer PC or a similar apparatus. The user end apparatus, moreover, has an independent monitoring routine 214 with regard to interruptions of the communication between both apparatuses.

A subroutine for identification of the test automation apparatus versus the user end apparatus arises from FIG. 9. The subroutine should more specifically clarify the steps 106 and 206 in duration identification and reasonably also apply to the steps 112 and 212 in individual identification. The steps 106 and 112 run in the test workflow program of the test automation apparatus 10. In a sub-step 1061, the test automation apparatus stores a key pair $S_{test}$, $V_{test}$ and a certificate $V_{test}$, $C_{user}$ in a first non-volatile memory.

The signer key $S_{test}$ is secret and, as a private key, is not published (given out). The verification key $V_{test}$ is public and thus can be published. The publication ensues together with a certificate Cert which confirms the authenticity.

The certificate Cert contains the verification key $V_{test}$ that is secured by means of a certifier signature $C_{user}$. The test key $V_{user}$ is public and, with a secret, private signer key $S_{user}$, forms a key pair. The secret, private signer key $S_{user}$ is required for generation of the certifier signature $C_{user}$ and is stored neither in the test automation apparatus nor in the user end apparatus. Although the secret, private signer key $S_{user}$ is unknown, the test key $V_{user}$ enables a check of the certificate Cert.

The steps 206 and 212 run in the test workflow program of the user end apparatus. In a sub-step 2061, the user end apparatus 1 stores a check key $V_{user}$ (which is required to check the certificate) in a second non-volatile memory.

In a sub-step 2062, the user end apparatus generates a random number r and transmits this to the test automation apparatus 10. The transmission of data is represented by a dashed arrow.

The test automation apparatus receives and processes the transmitted random number 4 in a sub-step 1062. A signing of the random number r with the secret, private signer key $S_{user}$ ensues by the private signer key $S_{test}$ and the random number r being linked by means of a mathematical signer function sign.

The signature Sig so generated, the public verification key $V_{test}$ and the associated certificate Cert are subsequently transmitted to the user end apparatus. The transmission of the aforementioned data is again represented by a dashed arrow. After the receipt of the transmitted data, their processing ensues in the sub-step 2063 via interpretation of the simulated key signals as key commands, whereby initially the certificate Cert is checked by means of a mathematical function of the check key $V_{user}$ and of the verification key $V_{test}$ and the signature Sig is subsequently checked by means of the verification key $V_{test}$ and the transmitted random number r. Given the occurrence of the correct random number r and of the verification key $V_{test}$ associated with the secret signer key $S_{user}$, the signature passes as real. The occurrence of the correct random number r and of the correct verification key $V_{test}$ is confirmed by the certificate Cert. The stored test key $V_{user}$ is required to check the signature $C_{user}$ of the certificate Cert. To conclude the data processing in the sub-step 2063, a transmission of an o.k. communication or, respectively, of the check result to the test automation apparatus ensues, which is again represented by a dashed arrow.

The test automation apparatus receives and processes the transmitted o.k. communication or the check result in the sub-step 1062 and generates an acknowledgement signal that is subsequently converted into simulated key signals and sent to the user end apparatus. The test workflow program then skips to the execution of the step 107. The user end apparatus receives and interprets the simulated key signals as key commands in the sub-step 2064. The user end apparatus, controlled by the release software, then skips to the execution of the step 207 in order to establish a valid identification.

The test output data such as, for example, print image data and write data for the chip card read/write unit require an authorization and identification of the test automation apparatus. The identification of the test automation apparatus can ensue in various manners:

a) via special key sequences on the keypad,
b) via plugging an access control card into the chip card read/write unit and
c) via a wireless identification.

The base configuration of the user end apparatus can be adjusted such that an identification is applicable only for the subsequent keyboard command (one-time identification) or that the identification activates a test output mode during which all test outputs protected via identification are provided at the test output interface until the test output mode is deactivated again (duration identification). The deactivation can in turn ensue via one of the aforementioned manners a) or b) or c) or simply by shutdown of the user end apparatus.

Relative to the identification via access control card, the identification via special key sequences has the advantage that it is suitable both for one-time identification and for duration identification and in both cases fits into the operation of the user end apparatus without difficulty.

In principle, a user end apparatus can support a one-time identification or offer a mode for identified users.

Given the one-time identification, an identification of the test automation apparatus is required for a function to be protected given invocation of the function to be protected. The user end apparatus executes the function only when the identification was successful.

Given a mode for identified users, after successful identification the user end apparatus jumps into a duration ID mode in which all functions to be protected are obtainable without further identification. In this case, the test automation apparatus could drive the user end apparatus in the mode for identified users and subsequently activate all functions without further measures. Moreover, the user end apparatus 1 is provided with the sensor 55 that detects whether the cable from the test automation apparatus remains connected with the keyboard socket on the mainboard or in a housing cavity. If it is interrupted (for example, because someone connects the keyboard again), the user end apparatus automatically ends the mode for identified users. The types of the identification of the test automation apparatus arise from the table 1.

| Identification via | One-time identification | Duration identification |
| --- | --- | --- |
| Key sequence on the keypad | Test automation system "presses" reserved function keys or reserved identification sequences during keyboard command | Test automation system activates a test mode via a keyboard command while it "presses" reserved function keys or reserved identification sequences. |
| Plugging in an access control card | | Test automation system activates a test mode via a keyboard command while it simulates the insertion of a corresponding access control card at the chip card reader |
| RFID token of the tester | | Tester activates a test mode via his RFID |

In addition to the identification via special key sequences and the identification via access control card, a wireless identification via RFID (Radio Frequency Identification Device) is also possible. For this, the user end apparatus must be equipped with a corresponding transmitter/receiver module.

In summary this abstraction of a machine group (with keypad) provides unused keys whose sequential actuation can be defined such that a cryptographic challenge-response protocol runs on the basis of digital signals, whereby the messages are encoded in key sequences. This type of the identification is advantageous when the franking machine has already incorporated a check key for a digital signature system.

The sequences of unused keys can be defined such that a cryptographic challenge-response identification protocol runs, whereby the messages are encoded in key sequences. A suitable different identification protocol is known from Fiat, A. and A. Shamir (1986), "How to prove yourself: practical solutions to identification and signature problems", Advances in Cryptology—CRYPTO'86, Lecture Notes in Computer Science, vol. 263, ed. A. Odlyzky, Springer-Verlag, Berlin, 186-194.

The interfaces connected with one another are physically identical serial interfaces. Every possible input (keyboard code, sensors, chip card input etc.) is thereby unambiguously encoded via an input parameter.

In an expanded exemplary embodiment, the test automation apparatus is designed as a client-server system (not shown), whereby the test automation server 80 offers various test scenarios via the internet and; the test automation client 10 realizes an internet connection via a third external interface 23. The test automation client 10 is connected with the test automation server 80 and provides the first and second interfaces 12, 11 as test input and test output interfaces at the user end apparatus 1. In this manner, via the test automation server one has the time-accurate control over which test scenarios are currently offered.

The advantages relative to the prior art also result because the different software architectures and the influences of country variants for the user end apparatus are minimized.

Although modifications and changes may be suggested by those skilled in the art, it is the intention of the inventors to embody within the patent warranted hereon all changes and modifications as reasonably and properly come within the scope of their contribution to the art.

We claim as our invention:

1. A test system for a user terminal apparatus, comprising:
   a test automation apparatus comprising a first processor and a non-volatile memory having a test workflow program stored therein, and a test interface connected to the control unit, said test workflow program causing said data processing unit to generate simulated test signals, respectively test commands, that are emitted at said test interface;
   in said user terminal apparatus, a second processor and a non-volatile memory protected by a security housing, and an internal interface, connected to said second processor, at said security housing in communication with said test interface of said test automation apparatus to receive said simulated test signals;
   an external interface at said user terminal apparatus connected to said second processor; and
   said second processor being configured to generate a digital signature input component and to transmit said digital signature input component from said user terminal apparatus to said test automation apparatus, and said first processor being configured to generate a digital signature using said digital signature input component and to cause said test signals to be transmitted from said test automation apparatus to said user terminal apparatus signed with said digital signature; and
   said second processor being configured to check and verify said digital signature and, if said digital signature is verified, to transmit a verification result from said user terminal apparatus to said test automation apparatus;
   said first processor being configured, only upon receipt of said verification result, to generate an acknowledgement signal and to transmit said acknowledgment signal to said user terminal apparatus; and
   said second processor being configured to receive said acknowledgement signal and to interpret said test commands represented by said test signals only if and when said acknowledgement signal is received.

2. A test system as claimed in claim 1 wherein said test automation apparatus comprises a further interface, that is in communication with said external interface of said user terminal apparatus, said further interface and said external interface each being a bi-directional serial interface.

3. A test system as claimed in claim 2 comprising a cable connecting the respective bi-directional serial interfaces of said automation apparatus and said user terminal apparatus.

4. A test system as claimed in claim 2 wherein each of said bi-directional serial interfaces comprises a transceiver, the respective transceivers of said bi-directional serial interfaces being in communication with each other via a communication channel.

5. A test system as claimed in claim 4 wherein each transceiver is plugged into the bi-directional serial interface associated therewith.

6. A test system as claimed in claim 4 wherein said communication channel is a wireless communication channel.

7. A test system as claimed in claim 1 wherein said test interface of said test automation apparatus and said internal interface of said user terminal apparatus are identical, and wherein said system comprises a cable connecting said test interface and said internal interface.

8. A test system as claimed in claim 1 wherein said test interface of said test automation apparatus and said internal interface of said user terminal apparatus and said internal interface of said user terminal apparatus are identical, and wherein each comprises a transceiver, the respective transceivers being in communication with each other via a communication channel.

9. A test system as claimed in claim 8 wherein said communication channel is a wireless communication channel.

10. A test system as claimed in claim 1 wherein said user terminal apparatus comprises a keyboard interface for non-test operation of said user terminal apparatus, said keyboard interface also serving as said internal interface.

11. A test system as claimed in claim 1 wherein said test automation apparatus comprises a personal computer, said personal computer comprising a further interface in communication with said external interface of said user terminal apparatus, said personal computer comprising an expansion card that activates said test interface to transmit said simulated test signals to said user terminal apparatus and that activates said further interface to receive said test output signals from said user terminal apparatus.

12. A test system as claimed in claim 11 wherein said expansion card comprises a contact field controlled by said first processor to simulate key signals.

13. A test system as claimed in claim 1 wherein said user terminal apparatus comprises at least one input device connected with said internal interface.

14. A test system as claimed in claim 13 wherein said user terminal apparatus comprises a plurality of input devices, said input devices being selected from the groups consisting of same types of input devices and different types of input devices.

15. A test system as claimed in claim 1 wherein said user terminal apparatus comprises at least one input device contained within said user terminal apparatus and in communication with said internal interface.

16. A test system as claimed in claim 1 wherein said user terminal apparatus comprises at least one input device disposed outside of said user terminal apparatus and in communication with said internal interface.

17. A test system as claimed in claim 16 wherein said at least one input device comprises an input device transceiver and wherein said internal interface comprises an interface transceiver, said input device transceiver and said interface transceiver being in wireless communication with each other.

18. A test system as claimed in claim 1 wherein said user terminal apparatus comprises an identification unit that identifies said test automation apparatus.

19. A test system as claimed in claim 18 wherein said identification unit comprises a chip card write/read unit, and wherein said second processor of said user terminal apparatus is programmed to enter an identification number of the test automation apparatus via a chip card.

20. A test system as claimed in claim 18 wherein said identification unit is an RFID transponder that communicates with an RFID tag of said test automation apparatus.

21. A test system as claimed in claim 1 wherein said test automation apparatus is a client-server system including a test automation server that offers different test scenarios via the Internet, and a test automation client having an Internet connection to said test automation server, said test automation client comprising said test interface, and a further interface connected to said external interface of said user terminal apparatus.

22. A test automation method comprising the steps of:
  in a test automation apparatus, generating test signals, representing test commands, that are to be supplied to a user terminal apparatus for testing said user terminal apparatus;
  from said user terminal apparatus, transmitting a digital signature input component to said test automation apparatus;
  in said test automation apparatus, generating a digital signature using said digital signature input component received from said user terminal apparatus, and signing said test signals with said digital signature;
  transmitting said test signals signed with said digital signature from said test automation apparatus to said user terminal apparatus;
  in said user terminal apparatus, verifying said digital signature and, upon verification of said digital signature, generating a verification result, and transmitting said verification result from said user terminal apparatus to said test automation apparatus;
  in said test automation apparatus, generating an acknowledgement signal only upon receipt of said verification result, and transmitting said acknowledgement signal to said user terminal apparatus; and
  in said terminal apparatus, interpreting said test commands represented by said test signals only if and when said acknowledgement signal is received by said user terminal apparatus.

* * * * *